Feb. 17, 1953  G. R. ERICSON  2,628,673
FUEL TANK
Filed Aug. 23, 1948

INVENTOR.
George R. Ericson

Patented Feb. 17, 1953

2,628,673

UNITED STATES PATENT OFFICE 2,628,673

FUEL TANK

George R. Ericson, Kirkwood, Mo., assignor to Carter Carburetor Corporation, St. Louis, Mo., a corporation of Delaware Application August 23, 1948, Serial No. 45,639

2 Claims. (Cl. 158—46)

This invention relates to compartment tanks, and more particularly, to tanks divided into compartments by flexible bulkheads so as to simultaneously accommodate in variable proportions a plurality of liquids.

It is well known that, under certain conditions, automobiles operate best with high-test gasoline, as for example, in ascending grades and during acceleration, while at other times, equally satisfactory operation can be achieved using less expensive low-test fuel. Obviously, the ratio between the low-test and high-test requirements would vary; for example, in a mountainous region, high test fuel would be in greater demand than on the prairies, though in both regions there would be conditions under which both types of fuel would be needed. Clearly, in view of space limitations on automobiles, it is not feasible to provide two large tanks, nor is it practical to have a tank of conventional size divided into fixed compartments, in view of the variable fuel requirement. Therefore, it is an object of this invention to provide a two-compartment tank in which the bulkhead separating the compartments is flexible for the purpose of varying the volume and capacity of the compartments.

Another object of this invention is to provide a tank of this type in which the flexible bulkhead can be removed and replaced with ease.

Other objects and advantages will be apparent from the following specification when read in connection with the accompanying drawings in which Fig. 1 is an environmental view of a two-compartment tank in connection with a two-fuel carburetor on a gasoline engine.

Figure 1:
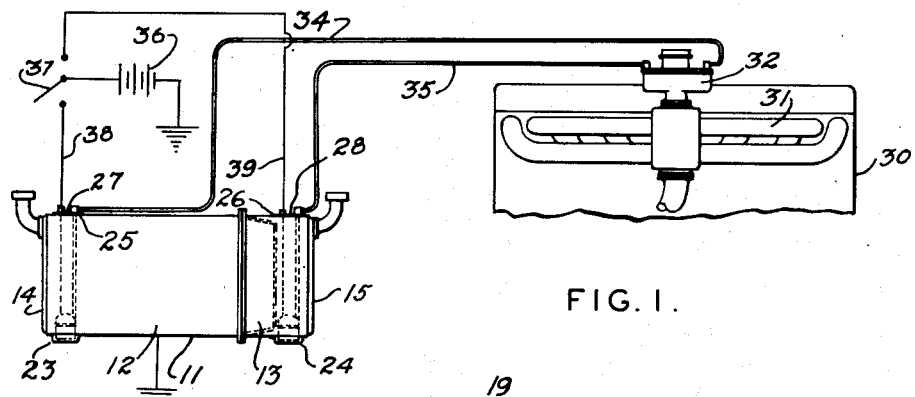
Figure 2:
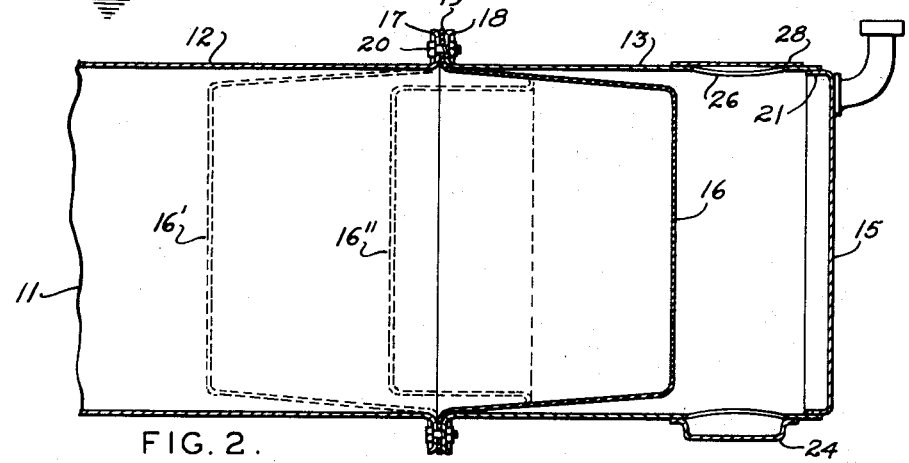
Fig. 2 is a sectional detailed view of the tank showing one form of flexible bulkhead.

Referring now to Figs. 1 and 2, the numeral 11 designates a tank which comprises tubular wall members 12 and 13, end bulkheads 14 and 15, and an intermediate flexible bulkhead 16.

At one end of tubular wall members 12 and 13, respectively, are formed outwardly extending annular flanges 17 and 18 for the purpose of providing means for fastening the two wall members 12 and 13 together.

The cup-shaped, flexible bulkhead 16 is formed of synthetic rubber, or other resilient gasoline resistant material, having formed on its open edge an outwardly extending annular flange 19. In the assembled tank, flange 19 is placed between flanges 17 and 18, and bolts and nuts 20, or other suitable means, are utilized to clamp the three flanges together. Flange 19, being of resilient material, acts as a gasket between the two metal flanges, thereby providing a liquid tight seal between the two compartments and between the interior and exterior of the tank.

End bulkheads 14 and 15 are each provided with a peripheral, axially extending flange 21 of the same general contour as the adjacent ends of tubular wall members 12 and 13, respectively, the external diameters of the flanges being substantially equal to the internal diameter of the wall member. Bulkheads 14 and 15 are fitted in the ends of tubular wall members 12 and 13, respectively, and flanges 21 are welded to the inner surface of the tubular wall members.

Adjacent the ends of wall members 12 and 13 are downwardly extending cylindrical well members 23 and 24, which are adapted to receive electric fuel pumps (shown in dotted lines on Fig. 1). Diametrically above well members 23 and 24, circular openings are made at 25 and 26 in tubular wall members 12 and 13, respectively, to permit access to the fuel pumps. Openings 25 and 26 are covered by circular plates 27 and 28.

Referring further to Fig. 1, a gasoline engine 30 is provided with an intake manifold 31, and mounted thereon, two-fuel carburetor 32. The low-test compartment of tank 11, enclosed by tubular wall members 12, is connected to carburetor 32 by means of a conduit 34. The high-test compartment, enclosed within tubular wall member 13, is similarly connected to two-fuel carburetor 32 by means of conduit 35. Plates 27 and 28 are formed with suitable openings to permit connections 38 and 39 between the electric fuel pumps and battery 36 or other source of electrical energy and to provide a connection between the electric pumps and the conduits 34 and 35. Means such as double throw switch 37 is provided for selectively energizing the pumps.

The operation of the tank is as follows: The two compartments are filled, respectively, with the desired proportions of low-test and high-test fuels, flexible bulkhead 16 accommodating itself to the relative amounts of fuel put in. If the proportion of high-test fuel is very small, the bulkhead 16 assumes the position shown in solid lines in Fig. 2. If the proportion of high-test fuel is high, flexible bulkhead 16 will be caused to conform generally to the dotted position 16'. When the proportion of high test fuel to low test fuel is neither very low, nor very high, the outer, or free portion of flexible bulkhead 16 will be urged to an approximate intermediate position, such as shown by dotted lines at 16", the exact position, of course, depending on the volumetric ratio between the two types of fuel. When either type fuel is required by the carburetor, the proper electric fuel pump forces the proper fuel out of the tank and through conduit 34 or 35, respectively, into the two-fuel carburetor 32.

If it becomes desirable or necessary to replace flexible bulkhead 16, as the result of excessive use or damage, replacement is easily effected by loosening bolts and nuts 20, separating flanges 17, 18, and 19 from each other, and removing the flexible bulkhead from the interior of tubular wall member 13 (or 12). Upon removal of the worn flexible bulkhead, a new one may be inserted, and the flanges 17, 18, and 19 bolted back together to provide a liquid tight seal between the two compartments and the exterior of the tank.

Figure 3:
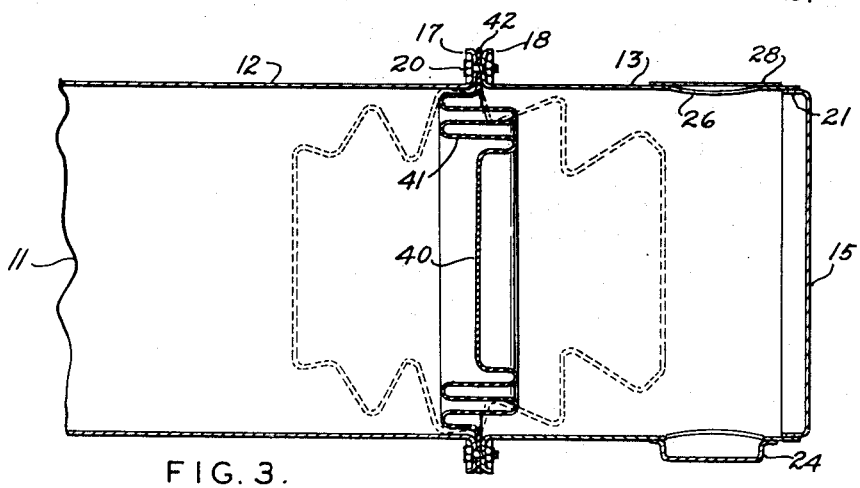
Fig. 3 is a sectional detailed view of the tank showing a modified form of flexible bulkhead.

Fig. 3 illustrates a modified form of flexible bulkhead, indicated by the numeral 40. Bulkhead 40 is molded of synthetic rubber or other resilient gasoline resistant material and is formed with a substantially plane center section surrounded by a plurality of annular pleats. On the periphery is flange 42, which is clamped between annular flanges 17 and 18 of the tubular wall members. Bulkhead 40 functions the same in all particulars as bulkhead 16, the operation of which is described above, pleats 41, however, permitting somewhat greater ease in changing conformation.

It will be understood that the constructional details of the two-fuel carburetor are in a developmental stage at the present time, but for completeness of disclosure, it may be noted that the carburetor 32 may be constructed and arranged according to the disclosure of the application, Serial No. 5,538, filed January 31, 1948, in the name of James T. W. Moseley and owned by the assignee of the present applicant.

This specification illustrates and describes in detail only the preferred embodiments of the invention and it is obvious that such deviations may be resorted to as do not form a departure from the spirit of the invention, as defined by the appended claims.

I claim:
1. In combination with an internal combustion automobile engine having a two-fuel carburetor, a tank having separate compartments for low and high test fuel, said tank including a flexible bulkhead separating the compartments of said tank to permit said tank to accommodate varying proportions of low and high test fuel, conduits connecting each compartment with said two-fuel carburetor, and a fuel pump for each of said conduits.

2. In combination with an internal combustion automobile engine having a two-fuel carburetor, a tank having separate compartments for low and high test fuel, said tank including a flexible bulkhead separating the compartments of said tank to permit said tank to accommodate varying proportions of low and high test fuel, an electric fuel pump mounted in each compartment, means for selectively energizing said electrical fuel pumps, and conduits connecting each electric fuel pump and said two-fuel carburetor.

GEORGE R. ERICSON.

REFERENCES CITED

The following references are of record in the file of this patent:

UNITED STATES PATENTS

| Number | Name | Date |
| --- | --- | --- |
| 1,311,044 | Cavanagh | July 22, 1919 |
| 1,556,526 | Krebs | Oct. 6, 1925 |
| 1,730,990 | Barnhart | Oct. 8, 1929 |
| 2,092,392 | Hewitt | Sept. 7, 1937 |
| 2,095,752 | La Brie | Oct. 12, 1937 |
| 2,097,985 | Maryott | Nov. 2, 1937 |
| 2,112,568 | Hoops | Mar. 29, 1938 |
| 2,129,930 | Hans | Sept. 13, 1938 |
| 2,132,952 | Hewitt | Oct. 11, 1938 |
| 2,163,241 | Huber | June 20, 1939 |
| 2,293,884 | Boyce | Aug. 25, 1942 |
| 2,371,632 | Lippincott | Mar. 20, 1945 |
| 2,394,431 | Curtis | Feb. 5, 1946 |
| 2,444,665 | Oberbeck | July 6, 1948 |

FOREIGN PATENTS

| Number | Country | Date |
| --- | --- | --- |
| 2,068 | Great Britain | of 1859 |
| 2,096 | Great Britain | of 1865 |